United States Patent
Yu

(10) Patent No.: US 7,268,844 B2
(45) Date of Patent: Sep. 11, 2007

(54) LIQUID CRYSTAL DISPLAY DEVICE

(75) Inventor: Chuan-Pei Yu, I-Lan Hsien (TW)

(73) Assignees: Innocom Technology (Shenzhen) Co., Ltd., Shenzhen (CN); Innolux Display Corp., Miao-Li (TW)

( * ) Notice: Subject to any disclaimer, the term of this patent is extended or adjusted under 35 U.S.C. 154(b) by 102 days.

(21) Appl. No.: 10/711,343

(22) Filed: Sep. 13, 2004

(65) Prior Publication Data

US 2005/0206806 A1    Sep. 22, 2005

(30) Foreign Application Priority Data

Mar. 16, 2004    (TW) ................ 93107011 A

(51) Int. Cl.
 *G02F 1/1335* (2006.01)
(52) U.S. Cl. ............................ 349/113; 349/64; 349/65
(58) Field of Classification Search ................ 349/113, 349/64–65
 See application file for complete search history.

(56) References Cited

U.S. PATENT DOCUMENTS

| 5,467,208 | A | * | 11/1995 | Kokawa et al. ............... 349/67 |
| 5,712,694 | A | * | 1/1998 | Taira et al. ..................... 349/9 |
| 5,724,108 | A | * | 3/1998 | Shibata ........................ 349/62 |
| 6,163,351 | A | * | 12/2000 | Nakayama .................... 349/61 |
| 6,191,833 | B1 | * | 2/2001 | Hirakata ....................... 349/61 |
| 6,222,598 | B1 | * | 4/2001 | Hiyama et al. ............... 349/65 |
| 6,222,689 | B1 | | 4/2001 | Higuchi et al. |
| RE37,377 | E | * | 9/2001 | Gunjima et al. ............... 349/9 |
| 6,339,458 | B1 | * | 1/2002 | Ohkawa ....................... 349/65 |
| 6,746,130 | B2 | * | 6/2004 | Ohkawa ..................... 362/617 |
| 2003/0063234 | A1 | * | 4/2003 | Oda et al. ..................... 349/65 |
| 2004/0061812 | A1 | * | 4/2004 | Maeda ........................ 349/65 |

FOREIGN PATENT DOCUMENTS

TW           531681 B       5/2003

* cited by examiner

*Primary Examiner*—Toan Ton
(74) *Attorney, Agent, or Firm*—Wei Te Chung

(57) ABSTRACT

A liquid crystal display device includes a liquid crystal display panel, a light source for providing light beams to irradiate the liquid crystal display panel, and an optical sheet positioned between the liquid crystal display panel and the light source and having a first surface facing the light source. Additionally, the first surface has a plurality of prisms for totally reflecting portions of ambient light beams that have passed through the liquid crystal display panel to irradiate the liquid crystal display panel.

20 Claims, 3 Drawing Sheets

LIQUID CRYSTAL DISPLAY DEVICE

BACKGROUND OF INVENTION

1. Field of the Invention

The present invention relates to a liquid crystal display device, and more specifically, to a micro-transflective liquid crystal display device with improved reflectivity.

2. Description of the Prior Art

Since the advantages of a liquid crystal display (LCD) device over a conventional CRT monitor include better portability, lower power consumption and lower radiation, the LCD device is widely used in various portable products, such as notebooks, personal data assistants (PDA), electronic toys, etc.

The LCD device is a passive luminous device, so that a supplemental light source is usually required to generate light beams when the LCD device displays images. In general, the LCD devices can be classified into reflective LCD devices, transmissive LCD devices and transflective LCD devices. A transmissive LCD device usually has a backlight module for generating light beams, which pass through a liquid crystal element and various optical elements such as polarizer for allowing users to see images displayed by the transmissive LCD device. However, when the intensity of ambient light beams is too high, display quality of the transmissive LCD device is degraded. Therefore, in order to solve the above-mentioned drawbacks, a micro-transflective LCD device is developed by adding a reflective element in the transmissive LCD device for reflecting the ambient light beams. Additionally, a reflective LCD device includes a reflective surface (such as aluminum) therein. Light beams such as ambient light beams enter the reflective LCD device from the front of the reflective LCD device, pass through a liquid crystal element and various optical elements, and are reflected by the reflective surface. Then, the reflected light beams pass through the liquid crystal element and the optical elements again such that users can see images displayed by the reflective LCD device. In addition, a transflective LCD device has characteristics of both the transmissive LCD device and the reflective LCD device. When intensity of the ambient light beams is high enough or the transflective LCD device requires fewer light beams to display images, the transflective LCD device reflects ambient light beams to display images. Additionally, when intensity of the ambient light beams is quite low or the transflective LCD device requires more light beams to display images, a backlight module in the transflective LCD device is switched on to generate light beams. Therefore, the transflective LCD device has an advantage of reducing power consumption of the backlight module.

Generally, reducing power consumption is major development of a portable electronic product such as a mobile phone, which is equipped with a LCD device. Hence, the transflective LCD device is usually applied in the portable electronic products because it has an advantage of low power consumption. Taking a mobile phone as an example, images displayed on a LCD device of the mobile phone usually include time or messages showing missed calls when the mobile phone is in a standby mode, and it does not require high intensity of light beams to display those images on the LCD device. Therefore, the LCD device of the mobile phone can reflect ambient light beams to display images when the mobile phone is in a standby mode. Additionally, a backlight module in the LCD device is switched on to generate light beams so that a user can clearly see images such as numerals or characters displayed on the LCD device when the mobile phone is in a use mode.

Generally, there are three kinds of transflective LCD devices or micro-transflective LCD devices that are briefly described as follows. The first one involves adding a reflective layer in a panel of a LCD device as disclosed in U.S. Pat. No. 6,493,051. However, since at least an extra thin-film deposition process and an extra photolithographic process are required in manufacturing such kind of LCD device, production cost is increased and the probability of forming defects may be raised owing to the higher amount of manufacturing processes, thereby reducing yield. The second one involves forming a reflective layer in a polarizer of a LCD device as disclosed in U.S. Pat. No. 6,018,419, but such kind of LCD device has disadvantage of a high production cost and complex manufacturing processes. The third one involves modifying patterns of a light-guiding plate of a backlight module and using a reflective plate of the backlight module to reflect ambient light beams. Nevertheless, portions of the ambient light beams will be lost in the light-guiding plate, thereby decreasing reflectivity of the ambient light beams and reducing brightness of images displayed on the LCD device.

SUMMARY OF INVENTION

It is therefore a primary objective of the claimed invention to provide a micro-transflective LCD device with improved reflectivity for solving the above-mentioned problem.

According to the claimed invention, a liquid crystal display device is provided. The liquid crystal display device includes a liquid crystal display panel, a light source for providing light beams to irradiate the liquid crystal display panel, and an optical sheet positioned between the liquid crystal display panel and the light source and having a first surface facing the light source. Additionally, the first surface has a plurality of prisms for totally reflecting portions of ambient light beams that have passed through the liquid crystal display panel to irradiate the liquid crystal display panel.

It is an advantage over the prior art that the liquid crystal display device of the claimed invention includes the optical sheet so that processes of forming a reflective layer in a panel or in a polarizer can be omitted, thereby decreasing production cost and increasing yield. Additionally, the ambient light beams for irradiating the liquid crystal display panel do not pass through a light-guiding plate and a reflective plate of a backlight module such that loss of the ambient light beams can be reduced, reflectivity of the ambient light beams can be increased and brightness of images displayed on the liquid crystal display device can be improved.

These and other objectives of the claimed invention will no doubt become obvious to those of ordinary skill in the art after reading the following detailed description of the preferred embodiment, which is illustrated in the multiple figures and drawings.

DETAILED DESCRIPTION

Figure 1:
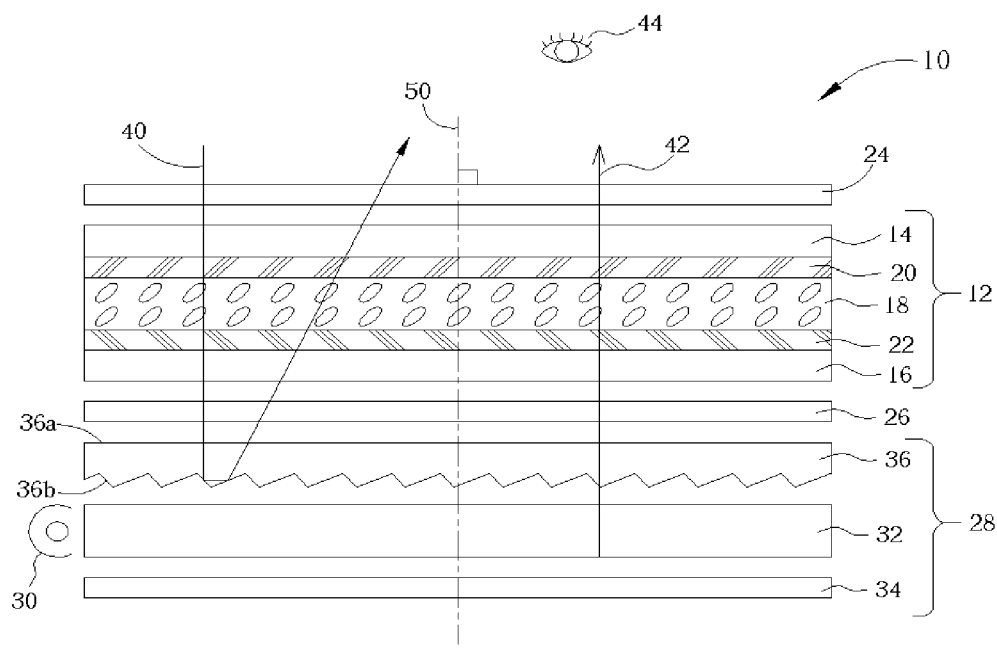
FIG. 1 is a LCD device according to the first embodiment of the present invention.
Figure 2:
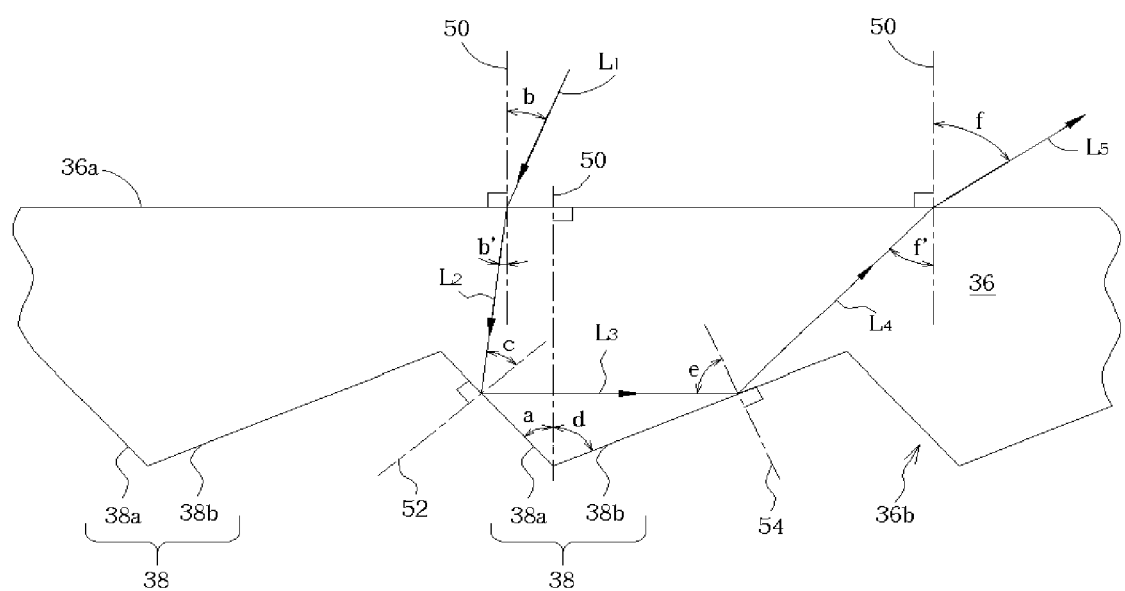
FIG. 2 is an enlarged diagram of an optical sheet shown in FIG. 1.

Please refer to FIG. 1 and FIG. 2. FIG. 1 is a LCD device according to the first embodiment of the present invention. FIG. 2 is an enlarged diagram of an optical sheet shown in FIG. 1. As shown in FIG. 1, a LCD device 10 includes a LCD panel 12, an upper polarizer 24 positioned on the LCD panel 12, a lower polarizer 26 positioned under the LCD panel 12, and a backlight module 28 positioned under the lower polarizer 26 for generating light beams. The LCD panel 12 includes an upper substrate 14, a lower substrate 16 and a liquid crystal layer 18 positioned between the upper substrate 14 and the lower substrate 16. The upper substrate 14 and the lower substrate 16 are usually composed of transparent material such as glass or quartz. Additionally, the LCD panel 12 further includes a conductive layer 20 positioned between the upper substrate 14 and the liquid crystal layer 18 and functioning as a common electrode, and a conductive layer 22 positioned between the lower substrate 16 and the liquid crystal layer 18 and functioning as a pixel electrode. The conductive layers 20 and 22 are usually composed of transparent conductive materials such as indium tin oxide (ITO) or IZO, and they are used to provide an electric field on the liquid crystal layer 18 for inducing liquid crystal molecules in the liquid crystal layer 18 to rotate according to the electric field and further provide desired light transmission. In addition, the LCD panel 12 further includes a color filter (not shown in FIG. 1) positioned on the upper substrate 14 for providing colorful images to users.

As shown in FIG. 1, the backlight module 28 includes a light source 30 for generating light beams, a light-guiding plate 32 positioned beside the light source 30 for guiding the light beams generated by the light source 30, a reflective plate 34 positioned under the light-guiding plate 32 for reflecting light beams upwards, and an optical sheet 36 positioned above the light-guiding plate 32 for totally reflecting portions of ambient light beams that have passed through the LCD panel 12. In the first embodiment of the present invention, the optical sheet 36 is a diffusing sheet and usually comprises polycarbonate (PC), polyethylene terephthalate (PET) or polymethyl methacrylate (PMMA). The light source 30 can be a cold cathode fluorescent light (CCFL), a hot cathode fluorescent light or a light emitting diode (LED). A protective diffusing sheet (not shown) and a prism (not shown) can be provided between the optical sheet 36 and the lower polarizer 26, and amounts and arrangement of the protective diffusing sheets and the prisms can be varied according to requirements of products.

As shown in FIG. 1, when ambient light beams 40 pass through the upper polarizer 24, the LCD panel 12 and the lower polarizer 26, portions of the ambient light beams 40 are totally reflected in the optical sheet 36. Then, the reflected ambient light beams 40 pass through the lower polarizer 26, the LCD panel 12 and the upper polarizer 24. Finally, a user 44 can see images displayed by the LCD device 10 while the backlight module 28 is switched off. On the other hand, when the backlight module 28 is switched on, light beams 42 generated by the light source 30 are guided by the light-guiding plate 32. Then, the light beams 42 pass through the optical sheet 36, the lower polarizer 26, the LCD panel 12 and the upper polarizer 24, such that a user 44 can see images displayed by the LCD device. Noticeably, pathways of the above-mentioned light beams 40 and 42 are explanatory but are not actual pathways of the light beams 40 and 42.

As described above, the present invention utilizes the optical sheet 36 to reflect the ambient light beams to the LCD panel 12 such that the LCD device 10 can display images when the backlight module 28 is switched off. For explaining the optical sheet 36 more clearly, the detailed structure of the optical sheet 36 is described as follows. As shown in FIG. 2, the optical sheet 36 includes a first surface 36a facing the LCD panel 12 and a second surface 36b facing the light-guiding plate 32. The second surface 36b is a rough surface and includes a plurality of prisms 38, each of which includes a first plane 38a and a second plane 38b for totally reflecting portions of the ambient light beams. Noticeably, a refractive index $n_1$ of the optical sheet 36 is between 1.4 and 1.6, and a refractive index $n_2$ of an ambient environment (i.e. air) is approximately equal to 1. That is, the refractive index $n_2$ of the ambient environment is smaller than the refractive index $n_1$ of the optical sheet 36. Therefore, when light beams are incident on the second surface 36b of the optical sheet 36 and an incident angle of the light beams is greater than a critical angle of the optical sheet 36, all of the light beams incident on the second surface 36b are reflected and cannot pass through an interface between the optical sheet 36 and the ambient environment, which is so-called total reflection. Accordingly, light beams can be totally reflected by the second surface 36b of the optical sheet 36 by modifying an included angle between the first plane 38a and the second plane 38b and selecting an optical sheet 36 with a suitable refractive index in the present invention. Generally, the smaller the included angle between the first plane 38a and the second plane 38b is or the larger the refractive index of the optical sheet 36 is, the easier the light beams can be totally reflected by the second surface 36b of the optical sheet 36. Furthermore, the included angle between the first plane 38a and the second plane 38b can be suitably modified in the present invention such that the reflected ambient light beams reflected by the optical sheet 36 are within a viewing angle of the LCD device 10, and further, a user can see images having preferable quality with the aids of a control system.

Additionally, a pathway which ambient light beams $L_1$ travel in the optical sheet 36 is described as follows. As shown in FIG. 2, when the ambient light beams $L_1$ enter the optical sheet 36 from an ambient environment, the ambient light beams $L_1$ are refracted and change their pathway to $L_2$ due to a variation of a refraction index. Then, the refracted light beams $L_2$ travel in the optical sheet 36 and are totally reflected by the first plane 38a of the prism 38. Thereafter, the reflected light beams $L_3$ are incident on the second plane 38b of the prism 38, and the light beams $L_3$ can be totally reflected or partially refracted and partially reflected according to a value of an incident angle e. After that, the reflected light beams $L_4$ travel in the optical sheet 36 and leave the optical sheet 36 via the first surface 36a. Further, the light beams $L_4$ are refracted and change their pathway to $L_5$ due to a variation of a refraction index. After the light beams $L_5$ leave the optical sheet 36, the light beams $L_5$ pass through the lower polarizer 26, the LCD panel 12 and the upper polarizer 24 shown in FIG. 1. Accordingly, the user 44 can see images displayed by the LCD device 10 when the backlight module 28 is switched off.

As described above, the included angle between the first plane 38a and the second plane 38b is suitably modified in the present invention such that the ambient light beams can be totally reflected by the second surface 36b of the optical sheet 36. Therefore, the following description will explain how to determine the included angle between the first plane 38a and the second plane 38b according to the present invention. As shown in FIG. 2, a is an included angle between a normal 50 of the first surface 36a and the first plane 38a, and based on a geometric relationship, a can be represented by:

$$a=90°-b'-c \quad (1)$$

Therein, b' is a refraction angle of the light beams $L_2$, and c is an incident angle of the light beams $L_2$ incident on the first plane 38a or c is an included angle between the light beams $L_2$ and a normal 52 of the first plane 38a. Since the light beams $L_1$ is refracted to the light beams $L_2$ and the incident angle of the light beams $L_1$ is b, the equation (1) can be rewritten as follows based on Snell's law.

$$a=90°-\sin^{-1}(n_1*\sin(b)/n_2)-c \quad (2)$$

Noticeably, in order to make the light beams $L_2$ be totally reflected by the first plane 38a, c should be larger than or equal to the critical angle of the optical sheet 36, i.e. $c \geq \sin^{-1}(n_1/n_2)$, wherein $n_1$ is a refractive index of the ambient environment, and $n_2$ is a refractive index of the optical sheet 36. Since $n_1$ and $n_2$ are given parameters, c can be derived from the above-mentioned relationship. Accordingly, as long the incident angle b of the light beams $L_1$ can be determined according to requirements of products, the included angle a between the first plane 38a and the normal 50 can be determined based on the equation (2).

As shown in FIG. 2, d is an included angle between the normal 50 of the first surface 36a and the second plane 38a, and based on a geometric relationship, d can be represented by:

$$d=45°+(f'-a+c)/2 \quad (3)$$

Therein, f' is an incident angle of the light beams $L_4$, and that is, f' is an included angle between the light beams $L_4$ and the normal 50 of the first surface 36a. Since the light beams $L_4$ are refracted to the light beams $L_5$ and f is a refraction angle of the light beams $L_5$, equation (3) can be rewritten as follows based on Snell's law.

$$d=45°+[\sin^{-1}(n_1*\sin(f)/n_2)-a+c]/2 \quad (4)$$

As mentioned above, $n_1$ and $n_2$ are given parameters so that c can be calculated and a can be derived from the equation (2). Then, the included angle d between the normal 50 and the second plane 38b can be determined according to the refraction angle f of the light beams $L_5$. That is, as long as the refraction angle f of the light beams $L_5$ is determined according to requirements of products, the included angle d between the second plane 38b and the normal 50 can be determined based on the equation (4). Therefore, based on the equation (2) and the equation (4), a theoretical value of the included angle, i.e. (a+d), between the first plane 38a and the second plane 38b can be calculated. After the theoretical value is calculated, the prisms 38 of the optical sheet 36 can be designed and manufactured according to the theoretical value such that the reflected ambient light beams reflected by the second surface 36b of the optical sheet 36 are within a viewing angle of the LCD device 10.

Figure 3:
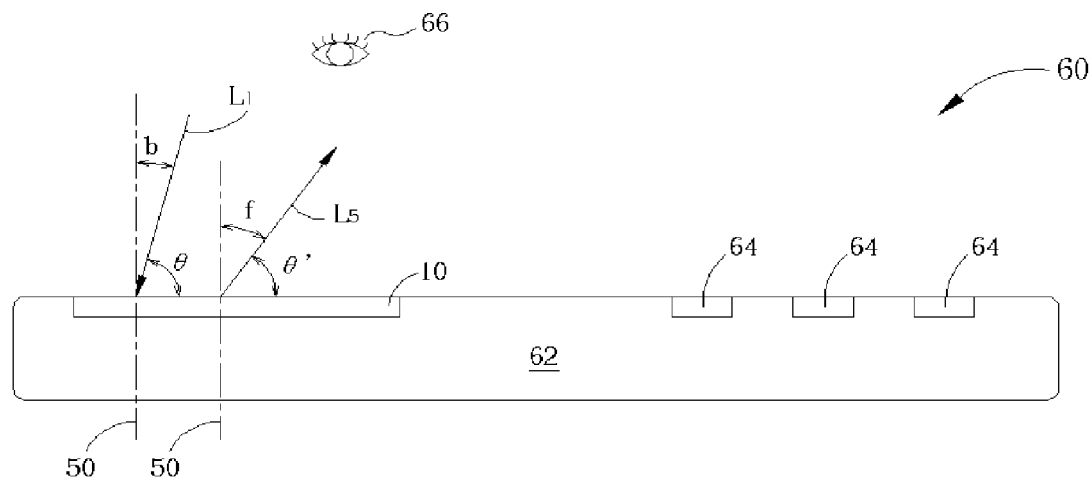
FIG. 3 is a side view of a mobile phone.

Taking a mobile phone as an example, the following description will explain how to determine an included angle between the first plane 38a and the second plane 38b of FIG. 2 according to requirements of products. Please refer to FIG. 3. FIG. 3 is a side view of a mobile phone. As shown in FIG. 3, a mobile phone 60 at least includes a housing 62, the LCD device 10 installed in the housing 62 and a plurality of keys 64 positioned on the housing 62. Due to habits of most users, when a user 66 sees images displayed on the LCD device 10, an included angle θ between the incident light beams $L_1$ and a surface of the LCD device 10 is between 30° and 90°, preferably between 75° and 90°. In addition, manufacturers usually expect that an included angle θ' between the reflected light beams $L_5$ and the surface of the LCD device 10 is between 30° and 90°, preferably between 45° and 90°. That is, in the equations (2) and (4), b and f can be represented by:

$$b \leq 60° \quad (5)$$

$$f \leq 60° \quad (6)$$

For the mobile phone 60, an included angle between the first plane 38a and the second plane 38b has to satisfy the equations (2), (4), (5) and (6), such that the reflected ambient light beams reflected by the second surface 36b of the optical sheet 36 can enter a field of viewing of the user 66. Generally, the included angle between the first plane 38a and the second plane 38b is usually between 80° and 130° such that the reflected ambient light beams reflected by the optical sheet 36 are within a viewing angle of the LCD device 10.

Figure 4:
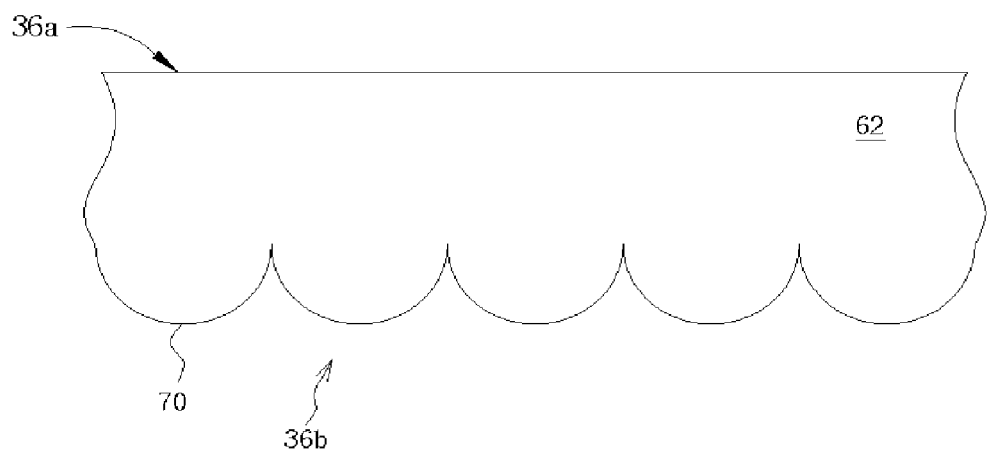
FIG. 4 is a schematic diagram of an optical sheet according to the second embodiment of the present invention.

Please refer to FIG. 4. FIG. 4 is a schematic diagram of an optical sheet according to the second embodiment of the present invention. As shown in FIG. 4, an optical sheet 36 includes a first surface 36a facing the LCD panel 12 and a second surface 36a facing the light-guiding plate 12. The second surface 36a includes a plurality of semicircular structures 70 that have the same function as the prisms 38. That is, the semicircular structures 70 are used to totally reflect portions of ambient light beams.

Figure 5:
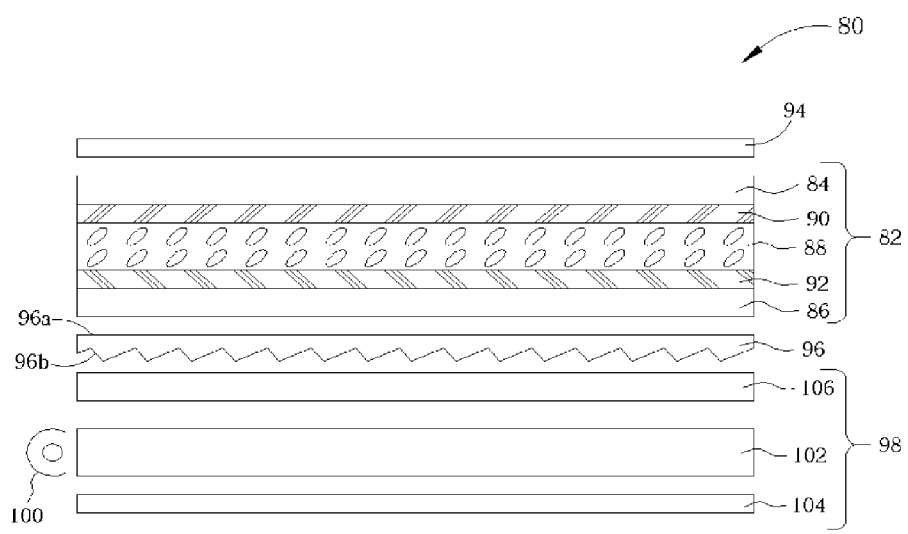
FIG. 5 is a LCD device according to the second embodiment of the present invention.

Please refer to FIG. 5. FIG. 5 is schematic diagram of a LCD device according to the second embodiment of the present invention. As shown in FIG. 5, a LCD device 80 includes a LCD panel 82, an upper polarizer 94 positioned on the LCD panel 82, a backlight module 98 positioned under the LCD panel 82, and an optical sheet 96 positioned between the LCD panel 82 and the backlight module 98. The optical sheet 96 is a lower polarizer and functions to totally reflect portions of ambient light beams that have passed through the LCD panel 82. The LCD panel 82 includes an upper substrate 84, a lower substrate 86, a liquid crystal layer 88 positioned between the upper substrate 84 and the lower substrate 86, a conductive layer 90 positioned between the upper substrate 84 and the liquid crystal layer 88, and a conductive layer 92 positioned between the lower substrate 86 and the liquid crystal layer 88. The backlight module 98 includes a light source 100, a light-guiding plate 102, a reflective plate 104, and a diffusing sheet 106.

Figure 6:
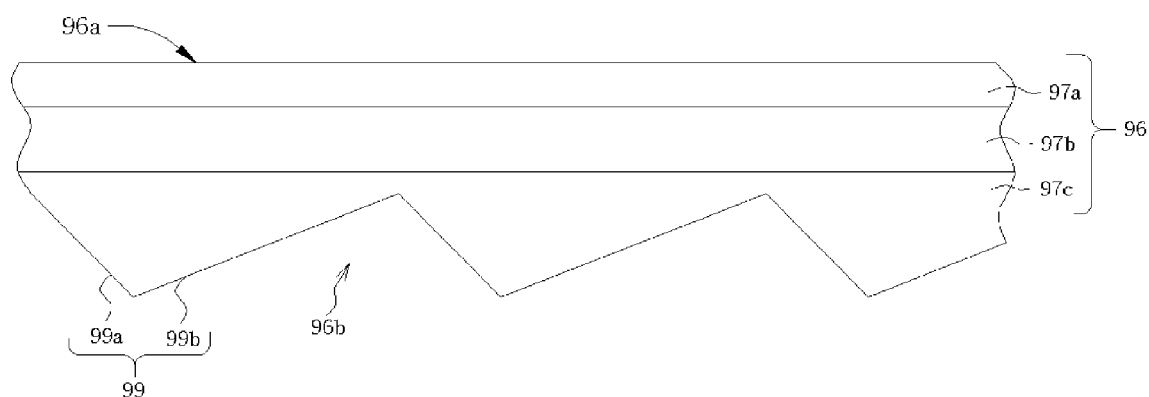
FIG. 6 is an enlarged diagram of the lower polarizer of FIG. 5.

Please refer to FIG. 6. FIG. 6 is an enlarged diagram of the lower polarizer shown in FIG. 5. As shown in FIG. 5 and FIG. 6, the lower polarizer 96 includes a first surface 96a facing the LCD panel 82 and a second surface 96b facing the backlight module 98. The lower polarizer 96 at least includes a protective film 97a, a protective film 97c having a plurality of prisms 99 thereon, and a polarizing film 97b formed between the protective film 97a and the protective film 97b. Each of the prisms 99 includes a first plane 99a and a second plane 99b for totally reflecting portions of ambient light beams that have passed through the LCD panel 82. Noticeably, portions of the ambient light beams can be totally reflected by the second surface 96b of the lower polarizer 96 by modifying an included angle between the first plane 99a and the second plane 99b and selecting a lower polarizer 96 with a suitable refractive index, such that the LCD device 80 of the present invention can display images when the backlight module 98 is switched off. Generally, the smaller the included angle between the first plane 99a and the second plane 99b is or the larger the refractive index of the lower polarizer 96 is, the easier the light beams can be totally reflected by the second surface 96b of the lower polarizer 96. Additionally, the protective films are composed of triacetylcellulose (TAc), and the polarizing film 97a is composed of poly vinyl alcohol (PVA).

Although the above-mentioned prisms 38 and 99 are symmetric structures and the backlight modules 28 and 98 belong to an edge-light type, the present invention is not limited to that. That is, the prisms 38 and 99 also can be asymmetric structures and the backlight modules 28 and 98 also can be a direct-light type.

In brief, a LCD device of the present invention includes an optical sheet having a rough surface and positioned between a LCD panel and a light source. As a backlight module is switched on, light beams generated by the light source pass through the optical sheet and the LCD panel such that the LCD device can display images to a user. On the other hand, when the backlight module is switched off, ambient light beams pass through the LCD panel and portions of the ambient light beams are totally reflected by the rough surface of the optical sheet. Then, the reflected ambient light beams pass through the LCD panel again such that the LCD device can display images to a user when the backlight module is switched off. As a result, when intensity of the ambient light beams is high enough, the present invention does not need to switch on the backlight module, thereby saving power consumption.

In comparison with the prior art, processes of forming a reflective layer in a panel or in a polarizer can be reduced in manufacturing the LCD device of the present invention. Therefore, the present invention can reduce production cost and improve production yield. Additionally, since the ambient light beams are reflected by the optical sheet in the present invention, the ambient light beams do not pass through a light-guiding plate and a reflective plate such that loss of the ambient light beams is reduced, reflectivity of the ambient light beams is increased and brightness of images displayed on the LCD device is improved.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A liquid crystal display device comprising:
   a liquid crystal display panel;
   a light source for providing light beams to irradiate the liquid crystal display panel; and
   an optical sheet positioned between the liquid crystal display panel and the light source and having a first surface facing the light source, the first surface having a plurality of prisms for totally reflecting portions of ambient light beams that have passed through the liquid crystal display panel to irradiate the liquid crystal display panel and to increase a brightness of the liquid crystal display device by the portions of ambient light beams, each of the prisms comprising a first plane and a second plane, an included angle between the first plane and the second plane being in the range between 80° and 130°.

2. The liquid crystal display device of claim 1 wherein each of the prisms is a symmetric structure or an asymmetric structure.

3. The liquid crystal display device of claim 1 wherein the optical sheet comprises a second surface facing the liquid crystal display panel.

4. The liquid crystal display device of claim 3 wherein a is an included angle between a normal of the second surface and the first plane of each prism, and $a=90°-\sin^{-1}(n_1*\sin(b)/n_2)-c$ wherein b is an incident angle of the ambient light beams when the ambient light beams are incident on the second surface of the optical sheet, $c=\sin^{-1}(n_1/n_2)$, $n_1$ is a refractive index of an ambient environment, and $n_2$ is a refractive index of the optical sheet.

5. The liquid crystal display device of claim 4 wherein b is less than or equal to 60°.

6. The liquid crystal display device of claim 4 wherein d is an included angle between the normal of the second surface and the second plane of each prism, and $d=45°+[\sin^{-1}(n_1*\sin(f)/n_2)-a+c]/2$, wherein f is a refraction angle of the ambient light beams when the ambient light beams leave the second surface of the optical sheet.

7. The liquid crystal display device of claim 6 wherein f is less than or equal to 60°.

8. The liquid crystal display device of claim 1 wherein the optical sheet is a diffusing sheet.

9. The liquid crystal display device of claim 8 wherein the optical sheet comprises polycarbonate (PC), polyethylene terephthalate (PET) or polymethyl methacrylate (PMMA).

10. The liquid crystal display device of claim 1 wherein the optical sheet is a polarizer.

11. A liquid crystal display device comprising:
    a liquid crystal display panel; and
    an optical sheet having a first surface facing the liquid crystal display panel and a second surface opposed to the first surface, the second surface comprising a plurality of prisms for totally reflecting portions of ambient light beams that have passed through the liquid crystal display panel to irradiate the liquid crystal display panel and to increase a brightness of the liquid crystal display device by the portions of ambient light beams, each of the prisms comprising a first plane and a second plane, an included angle between the first plane and the second plane being in the range between 80° and 130°.

12. The liquid crystal display device of claim 11 wherein each of the prisms is a symmetric structure or an asymmetric structure.

13. The liquid crystal display device of claim 11 wherein a is an included angle between a normal of the first surface and the first plane of each prism, and $a=90°-\sin^{-1}(n_1*\sin(b)/n_2)-c$, wherein b is an incident angle of the ambient light beams when the ambient light beams are incident on the first surface, $c=\sin^{-1}(n_1/n_2)$, $n_1$ is a refractive index of an ambient environment, and $n_2$ is a refractive index of the optical sheet.

14. The liquid crystal display device of claim 13 wherein b is less than or equal to 60°.

15. liquid crystal display device of claim 13 wherein d is an included angle between the normal of the first surface and the second plane of each prism, and $d=45°+[\sin^{-1}(n_1*\sin(f)/n_2)-a+c]/2$, wherein f is a refraction angle of the ambient light beams when the ambient light beams leave the first surface of the optical sheet.

16. The liquid crystal display device of claim 15 wherein f is less than or equal to 60°.

17. The liquid crystal display device of claim 11 wherein the optical sheet is a diffusing sheet.

18. The liquid crystal display device of claim 17 wherein the optical sheet comprises polycarbonate, polyethylene terephthalate or polymethyl methacrylate.

19. The liquid crystal display device of claim 11 wherein the optical sheet is a polarizer.

20. The liquid crystal display device of claim 11 further comprising a light source for providing light beams to irradiate the liquid crystal display panel, and the optical sheet being positioned between the liquid crystal display panel and the light source.

* * * * *